US012683151B2

(12) United States Patent
Frieberg et al.

(10) Patent No.:     US 12,683,151 B2
(45) Date of Patent:          Jul. 14, 2026

(54) SOLID ELECTROLYTE COATING OF LITHIUM-DOPED SILICON OXIDE PARTICLES AS ANODE ACTIVE MATERIAL

(71) Applicants: Bradley R. Frieberg, Farmington Hills, MI (US); Zhongyi Liu, Troy, MI (US); Xiaosong Huang, Novi, MI (US); Mark W. Verbrugge, Troy, MI (US); Zhe Li, Shanghai (CN)

(72) Inventors: Bradley R. Frieberg, Farmington Hills, MI (US); Zhongyi Liu, Troy, MI (US); Xiaosong Huang, Novi, MI (US); Mark W. Verbrugge, Troy, MI (US); Zhe Li, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 998 days.

(21) Appl. No.: 17/551,753

(22) Filed: Dec. 15, 2021

(65)          Prior Publication Data
      US 2023/0128413 A1      Apr. 27, 2023

(30)      Foreign Application Priority Data

Oct. 21, 2021    (CN) .......................... 202111225487.X

(51) Int. Cl.
   *H01M 4/38*          (2006.01)
   *H01M 4/134*         (2010.01)
               (Continued)
(52) U.S. Cl.
   CPC ........... *H01M 4/386* (2013.01); *H01M 4/134* (2013.01); *H01M 4/1395* (2013.01); *H01M 10/0525* (2013.01); *H01M 2300/0071* (2013.01)

(58) Field of Classification Search
   CPC .... H01M 4/386; H01M 4/134; H01M 4/1395; H01M 4/1315; H01M 2300/0071;
               (Continued)

(56)          References Cited
         U.S. PATENT DOCUMENTS 11,139,464 B2    10/2021   Ohsawa et al.
   11,600,851 B2     3/2023   Li et al.
               (Continued)

FOREIGN PATENT DOCUMENTS

CN        110649218 A      1/2020
   CN        112670559 A      4/2021
               (Continued)

OTHER PUBLICATIONS

First Office Action for Chinese Patent Application No. 202111225487.X issued Mar. 3, 2025, with correspondence from China Patent Agent (H.K.) Ltd summarizing Office Action; 12 pages.
               (Continued)

*Primary Examiner* — Kaj K Olsen
(74) *Attorney, Agent, or Firm* — Harness, Dickey & Pierce, P.L.C.

(57)          ABSTRACT

An anode material includes a plurality of negative solid-state electroactive particles. Each of the plurality of negative solid-state electroactive particles may include a lithium-doped silicon oxide and a solid electrolyte coating at least substantially continuously disposed over substantially all of the surface of the lithium-doped silicon oxide.

15 Claims, 4 Drawing Sheets

(51) Int. Cl.
     *H01M 4/1395* (2010.01)
     *H01M 10/0525* (2010.01)
(58) Field of Classification Search
     CPC ...... H01M 4/131; H01M 4/625; H01M 4/485;
              H01M 4/525; H01M 2004/027; H01M
              4/405; H01M 4/58; H01M 4/388; H01M
                              2300/0017; H01M 4/366
     See application file for complete search history.

(56) References Cited

U.S. PATENT DOCUMENTS

| | | | |
|---|---|---|---|
| 2011/0045355 A1* | 2/2011 | Ichikawa | H01M 4/043 |
| | | | 429/231.95 |
| 2012/0028128 A1* | 2/2012 | Seino | C01G 45/1242 |
| | | | 429/304 |
| 2020/0035992 A1 | 1/2020 | Ohsawa et al. | |
| 2021/0013542 A1 | 1/2021 | Takahashi et al. | |
| 2021/0126250 A1 | 4/2021 | Jiang et al. | |

| | | | |
|---|---|---|---|
| 2021/0367224 A1* | 11/2021 | Gaben | H01M 4/0423 |
| 2022/0223838 A1* | 7/2022 | Nitta | H01M 4/364 |
| 2023/0223522 A1* | 7/2023 | Si | H01M 4/62 |
| | | | 429/231.6 |
| 2024/0204188 A1* | 6/2024 | Yabe | H01M 4/364 |

FOREIGN PATENT DOCUMENTS

| | | | |
|---|---|---|---|
| CN | 116014070 A | | 4/2023 |
| DE | 102022118225 A1 | | 4/2023 |
| FR | 3080862 | * | 8/2019 |
| JP | 2014067687 A | | 4/2014 |

OTHER PUBLICATIONS

Second Office Action for Chinese Patent Application No. 202111225487.X issued Aug. 7, 2025, with correspondence from China Patent Agent (H.K.) Ltd summarizing Office Action; 10 pages.

* cited by examiner

SOLID ELECTROLYTE COATING OF LITHIUM-DOPED SILICON OXIDE PARTICLES AS ANODE ACTIVE MATERIAL

CROSS-REFERENCE TO RELATED APPLICATIONS

This application claims the benefit and priority of Chinese Application No. 202111225487.X, filed Oct. 21, 2021. The entire disclosure of the above application is incorporated herein by reference.

FIELD

The present disclosure relates to lithium-doped silicon oxide particles having a solid electrolyte coating, for example, which may be used as an anode active material. The present disclosure also relates to electrochemical cells and electrodes including lithium-doped silicon oxide particles having a solid electrolyte coating, and methods for making the same.

INTRODUCTION

This section provides background information related to the present disclosure which is not necessarily prior art.

Electrochemical energy storage devices, such as lithium-ion batteries, can be used in a variety of products, including automotive products, such as start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes, a separator, and an electrolyte. Lithium-ion batteries may also include various terminal and packaging materials. One of the two electrodes serves as a positive electrode or cathode, and the other electrode serves as a negative electrode or anode. Many rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes.

The electrolyte may be suitable for conducting lithium ions between the electrodes and, like the two electrodes, may be in a solid form, a liquid form, or a solid-liquid hybrid form. In the instances of solid-state batteries, which include a solid-state electrolyte layer disposed between solid-state electrodes, the solid-state electrolyte layer physically separates the electrodes so that a distinct separator is not required.

Solid-state batteries may have advantages over batteries that include a separator and a liquid electrolyte. These advantages can include a longer shelf life with lower self-discharge, simpler thermal management, a reduced need for packaging, and the ability to operate within a wider temperature window. For example, solid-state electrolytes are generally non-volatile and non-flammable, so as to allow cells to be cycled under harsher conditions without experiencing diminished potential or thermal runaway, which can potentially occur with the use of liquid electrolytes. However, solid-state batteries may exhibit limited performance capabilities that may be, for example, the result of undesired reactivity of the solid-state electroactive particles with respect to other battery components or materials used in battery preparation. Additionally, limited performance capabilities may also be a result of impedance caused by limited contact, or void spaces, between the solid-state electroactive particles and/or the solid-state electrolyte particles. Accordingly, it would be desirable to develop high-performance solid-state battery materials and methods that that limit undesired reactivity of electroactive particles and/or improve impedance characteristics.

It would be desirable to develop high-performance electrode materials and methods that that limit undesired reactivity of electroactive particles and/or improve impedance characteristics with electrolytes (e.g., solid electrolytes) in lithium-ion batteries.

SUMMARY

This section provides a general summary of the disclosure, and is not a comprehensive disclosure of its full scope or all of its features.

The present disclosure relates to relates to lithium-doped silicon oxide particles having a solid electrolyte coating, for example, which may be used as an anode active material. The present disclosure also relates to electrochemical cells and electrodes including such lithium-doped silicon oxide particles.

For example, the present technology provides anode materials comprising a plurality of negative solid-state electroactive particles, each of the plurality of negative solid-state electroactive particles comprising: a lithium-doped silicon oxide; and a solid electrolyte coating. The present technology also provides anodes comprising a plurality of such negative solid-state electroactive particles. The solid electrolyte coating substantially continuously disposed over substantially all of the surface of the lithium-doped silicon oxide. In various embodiments, the solid electrolyte coating may have a thickness from about 1 nanometer (nm) to about 500 nm.

In various embodiments, the lithium-doped silicon oxide comprises $Li_ySiO_x$, $y \leq 4$, $0 \leq x \leq 2$. In various embodiments, the solid electrolyte coating may comprise $Li_3PS_4$, or $Li_{7-m}X$, where $0 \leq m \leq 1$ and where X is chlorine (Cl), bromine (Br), or iodine (I).

The present technology provides methods of preparing an anode material, wherein the anode material comprises a plurality negative solid-state electroactive particles, each of the plurality of negative solid-state electroactive particles comprising a coated lithium-doped silicon oxide, the method comprising: preparing a solid electrolyte precursor solution, the solid electrolyte precursor solution comprising a solid electrolyte precursor and a solvent; and contacting a plurality of lithium-doped silicon oxide particles with the solid electrolyte precursor solution to form a solid electrolyte coating. In various embodiments, the solid electrolyte precursor comprises $P_4S_{16}$, and wherein the solvent comprises n-methyl-2-pyrrolidone (NMP), or $Li_{7-m}PS_{6-m}X$, where $0 \leq m \leq 1$ and where X is chlorine (Cl), bromine (Br), or iodine (I), wherein the solvent comprises an ester and an alcohol as co-solvents.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected example embodiments and not all possible implementations, and are not intended to limit the scope of the present disclosure.

Figure 1:
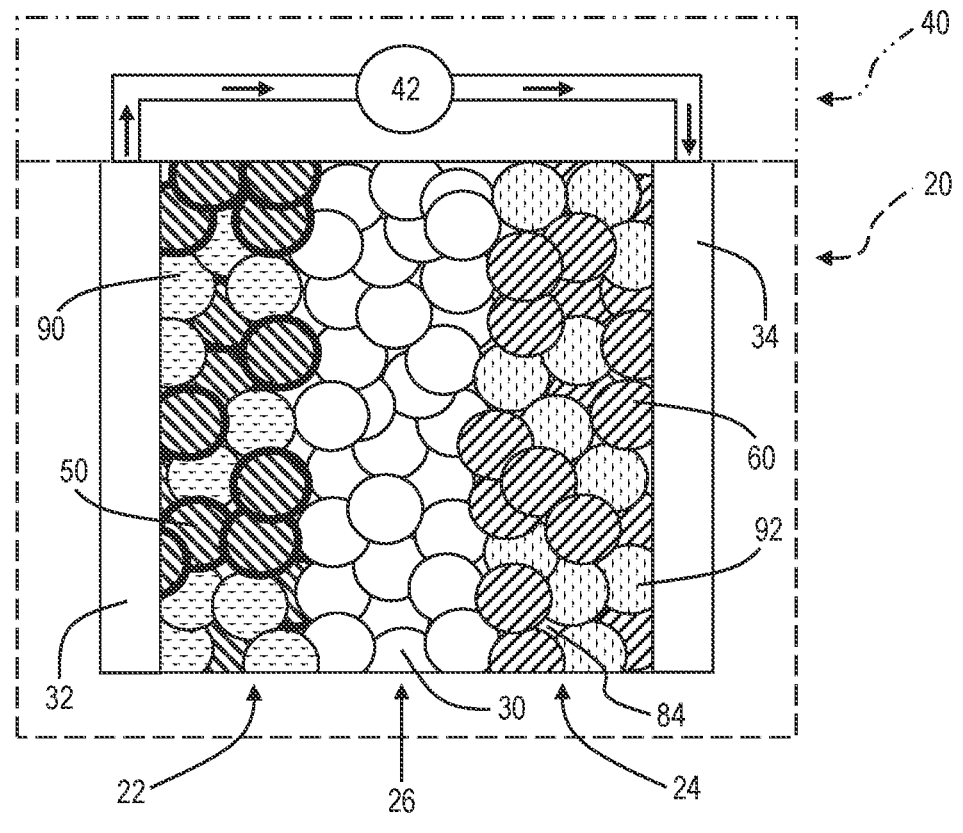
FIG. 1 is an illustration of an example battery of the present technology.

It should be noted that the figures set forth herein are intended to exemplify the general characteristics of materials, components, devices and methods among those of the present technology, for the purpose of the description of certain embodiments. These figures may not precisely reflect the characteristics of any given embodiment, and are not necessarily intended to define or limit specific embodiments within the scope of this technology. Corresponding reference numerals indicate corresponding parts throughout the several views of the drawings.

DETAILED DESCRIPTION

The present disclosure relates to relates to lithium-doped silicon oxide particles having a solid electrolyte coating, for example, which may be used as an anode active material. The present disclosure also relates to electrochemical cells and electrodes including lithium-doped silicon oxide particles having a solid electrolyte coating, and methods for making the same.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. A non-limiting discussion of terms and phrases intended to aid understanding of the present technology is provided at the end of this Detailed Description.

Electrochemical Cell/Battery

An exemplary and schematic illustration of an electrochemical cell 20 (also referred to herein as "the battery"), that cycles lithium ions is shown in FIG. 1. Notably, the components shown in the electrochemical cell 20 are not to scale. Unless specifically indicated otherwise, the term "ions" as used herein refers to lithium ions. The battery 20 includes a negative electrode 22, a positive electrode 24, and an electrolyte 26 disposed between the negative electrode 22 and the positive electrode 24. The electrolyte 26 may be, for example, a liquid or solid. As depicted for a solid-state electrolyte 26, the electrolyte may be defined by a first plurality of solid-state electrolyte particles 30, it being understood that one of ordinary skill in the art will recognize that FIG. 1 may generally depict structures of a battery 20 having a liquid electrolyte. A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34).

The battery 20 can generate an electric current (indicated by the block arrows) during discharge by way of reversible electrochemical reactions that occur when the external circuit 40 is closed (to connect the negative electrode 22 and the positive electrode 24) and the negative electrode 22 contains a relatively greater quantity of lithium. The chemical potential difference between the negative electrode 22 and the positive electrode 24 drives electrons produced by the oxidation of inserted lithium at the negative electrode 22 through the external circuit 40 towards the positive electrode 24. Ions, which are also produced at the negative electrode 22, are concurrently transferred through the electrolyte 26 towards the positive electrode 24. The electrons flow through the external circuit 40, and the ions migrate across the electrolyte 26 to the positive electrode 24 where they may be plated, reacted, or intercalated. The electric current passing through the external circuit 40 can be harnessed and directed through the load device 42 (in the direction of the block arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The connection of the external power source to the battery 20 compels the non-spontaneous oxidation of one or more metal elements at the positive electrode 24 to produce electrons and ions. The electrons, which flow back towards the negative electrode 22 through the external circuit 40, and the ions, which move across the electrolyte 26 back towards the negative electrode 22, reunite at the negative electrode 22 and replenish it with lithium for consumption during the next battery discharge cycle. As such, each discharge and charge event is considered to be a cycle, where ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as AC wall outlets and motor vehicle alternators. In some configurations of the battery 20, each of the negative electrode current collector 32, the negative electrode 22, the electrolyte 26, the positive electrode 24, and the positive electrode current collector 34 are prepared as relatively thin layers (for example, from several microns to a millimeter or less in thickness) and assembled in layers connected in parallel arrangement to provide a suitable electrical energy and power package. In various other instances, the battery 20 may include electrodes 22, 24 that are electrically connected in series.

Further, in certain aspects, the battery 20 may include a variety of other components that, while not depicted here, are nonetheless known to those of skill in the art. For instance, the battery 20 may include a casing, a gasket, terminal caps, and any other conventional components or materials that may be situated within the battery 20, including between or around the negative electrode 22, the positive electrode 24, and/or the electrolyte 26, by way of non-limiting example. For example, the battery 20 may comprise a separator (not shown) between the negative electrode 22 and positive electrode 24, e.g., in batteries 20 comprising a liquid electrolyte. As noted above, the size and shape of the battery 20 may vary depending on the particular applications for which it is designed. Battery-powered vehicles and hand-held consumer electronic devices are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate an electric current to the load device 42 that can be operatively connected to the external circuit 40. The load device 42 may be powered fully or partially by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy.

Electrolyte

Batteries of the present technology comprise an electrolyte, which serves as a medium for transport of ions between a negative electrode and positive electrode during charging and discharging of the battery. Such electrolytes may be generally characterized as liquid or solid, it being recognized that electrolytes may be gels or semi-solid.

In various embodiments, batteries of the present technology comprise a liquid electrolyte, comprising a salt in a solvent. For example, the electrolyte may comprise a lithium salt, such as $LiPF_6$, $LiBF_4$ or $LiClO_4$ in an organic solvent, such as ethylene carbonate, dimethyl carbonate, or diethyl carbonate.

With further reference to FIG. 1, a battery of the present technology may comprise a solid electrolyte 26, which may provide electrical separation— preventing physical contact—between the negative electrode 22, i.e., an anode, and the positive electrode 24, i.e., a cathode. The solid-state electrolyte 26 may also provide a minimal resistance path for internal passage of ions. In various aspects, as noted above, the first plurality of solid-state electrolyte particles 30 may define the solid-state electrolyte 26. In certain aspects, the first solid-state electrolyte particles 30 comprise a NASI-CON-type superionic conducting glass ceramic, such as $Li_{1+x}Al_xGe_{2-x}(PO_4)_3$ (LAGP), or $Li_{1+x}Al_xTi_{2-x}(PO_4)_3$ where $0<x<1$ and $0<y<2$ (LATP), a Perovskite such as $Li_xLa_yTiO_3$ where $0<x<1$ and $0<y<1$ (LLTO); $Li_{2+2x}Zn_{1-x}GeO_4$ where $0<x<1$ (LISICON); a sulfide-type ceramic/glass, such as $Li_{10}GeP_2S_{12}$ (LGPS), $Li_{3.25}Ge_{0.25}P_{0.75}S_4$, $Li_4GeS_4$ and $Li_6PS_5Cl$; a ceramic oxide, such as garnet type $Li_aLa_bZr_cO_d$ materials, such as $Li_7La_3Zr_2O_{12}$ (LLZO); $Li_2PO_2N$ (LIPON), and combinations thereof, as non-limiting examples. In certain aspects, the first plurality of solid-state electrolyte particles 30 optionally comprise a dopant. Solid-state electrolyte materials may be selected to be stable in the presence of certain electroactive materials, like lithium.

The solid-state electrolyte 26 may be in the form of a layer or a composite that comprises the first plurality of solid-state electrolyte particles 30. For example, the solid-state electrolyte 26 may be in the form of a layer having a thickness greater than or equal to about 1 µm to less than or equal to about 1 mm, and in certain aspects, optionally greater than or equal to about 1 µm to less than or equal to about 100 µm. Such solid-state electrolyte 26 after processing into a consolidated form or final state may have an interparticle porosity between the respective solid-state electrolyte particles of less than or equal to about 10 vol. %, optionally less than or equal to about 5 vol. %.

Positive Electrode

The positive electrode 24 may be formed from a lithium-based or electroactive material that can undergo lithium intercalation and deintercalation while functioning as the positive terminal of the battery 20. For example, while not limiting, in certain variations, the positive electrode 24 may be defined by the plurality of positive solid-state electroactive particles 60. However, it should be noted that the positive electrode 24 is not limited to the configuration shown in FIG. 1 and may be in a variety of forms, including a solid electrode, a semi-solid, gas, or liquid electrode.

In certain instances, for example, as illustrated in FIG. 1, the positive electrode 24 is a composite comprising a mixture of the positive solid-state electroactive particles 60 and a third plurality of solid-state electrolyte particles 92, it being understood that cathodes in batteries having liquid electrolytes may not comprise solid electrolyte particles. For example, the positive electrode 24 may include greater than or equal to about 10 wt. % to less than or equal to about 95 wt. %, and in certain aspects, optionally greater than or equal to about 50 wt. % to less than or equal to about 90 wt. %, of the positive solid-state electroactive particles 60 and greater than or equal to about 5 wt. % to less than or equal to about 70 wt. %, and in certain aspects, optionally greater than or equal to about 10 wt. % to less than or equal to about 30 wt. %, of the third plurality of solid-state electrolyte particles 92. The positive electrode 24 may have an interparticle porosity between the positive solid-state electroactive particles 60 and/or the third solid-state electrolyte particles 92 that is less than or equal to about 20 vol. %, optionally less than or equal to about 10 vol. %. In certain variations, the third plurality of solid-state electrolyte particles 92 may be the same as or different from the first plurality of solid-state electrolyte particles 30 in the solid-state electrolyte 26, with respect to composition, size, or combinations thereof.

The positive electrode 24 may include any suitable positive electroactive materials that can cycle lithium. In various aspects, the positive electrode 24 may be formed of a plurality of positive solid-state electroactive particles 60 that is one of a layered-oxide cathode, a spinel cathode, or a polyanion cathode. For example, in the instances of a layered-oxide cathode (e.g., rock salt layered oxides), the positive solid-state electroactive particles 60 may comprise one or more positive electroactive materials selected from $LiCoO_2$, $LiNi_xMn_yCo_{1-x-y}O_2$ (where $0\leq x\leq 1$ and $0\leq y\leq 1$), $LiNi_xMn_{1-x}O_2$ (where $0\leq x\leq 1$), and $Li_{1+x}MO_2$ (where $0\leq x\leq 1$). The spinel cathode may include one or more positive electroactive materials, such as $LiMn_2O_4$ and $LiNi_xMn_{1.5}O_4$. The polyanion cathode may include, for example, a phosphate such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ and/or a silicate such as $LiFeSiO_4$. In various aspects, the positive solid-state electroactive particles 60 may comprise one or more positive electroactive materials selected from the group consisting of $LiCoO_2$, $LiNi_xMn_yCo_{1-x-y}O_2$ (where $0\leq x\leq 1$ and $0\leq y\leq 1$), $LiNi_xMn_{1-x}O_2$ (where $0\leq x\leq 1$), $Li_{1+x}MO_2$ (where $0\leq x\leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In other aspects, additional materials that may be appropriate to provide a desired voltage between the positive electrode 24 and the negative electrode 22 may be used.

In certain variations, the positive solid-state electroactive particles 60 may be optionally intermingled with one or more electrically conductive materials that provide an electron conduction path and/or at least one polymeric binder material (not shown) that improves the structural integrity of the positive electrode 24. Electrically conductive materials may include, for example, carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer may include polyaniline, polythiophene, polyacetylene, polypyrrole, and the like. In certain aspects, mixtures of the conductive materials may be used. The positive solid-state electroactive particles 60 may be optionally intermingled with binders, like polyvinylidene difluoride (PVDF), poly-tetrafluoroethylene (PTFE), ethylene propylene diene monomer (EPDM) rubber, nitrile butadiene rubber (NBR), styrene-butadiene rubber (SBR), lithium polyacrylate (LiPAA), and/or sodium polyacrylate (NaPAA) binders.

The positive electrode 24 may include greater than or equal to about 0 wt. % to less than or equal to about 25 wt. %, optionally greater than or equal to about 0 wt. % to less than or equal to about 10 wt. %, and in certain aspects, optionally greater than or equal to about 0 wt. % to less than or equal to about 5 wt. % of the one or more electrically conductive materials and greater than or equal to about 0 wt. % to less than or equal to about 20 wt. %, optionally greater than or equal to about 0 wt. % to less than or equal to about 10 wt. %, and in certain aspects, optionally greater than or equal to about 0 wt. % to less than or equal to about 5 wt. % of the one or more binders.

The positive electrode current collector 34 may be formed from aluminum (Al) or any other electrically conductive material known to those of skill in the art.

Negative Electrode

The negative electrode 22 may be formed from a lithium host material that is capable of functioning as a negative terminal of a lithium-ion battery. For example, in certain variations, the negative electrode 22 may be defined by a plurality of the negative solid-state electroactive particles 50.

In certain instances, the negative electrode 22 is a composite comprising a mixture of the plurality of negative solid-state electroactive particles 50 and a second plurality of solid-state electrolyte particles 90. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the plurality of negative solid-state electroactive particles 50 and greater than or equal to about 0 wt. % to less than or equal to about 50 wt. %, and in certain aspects, optionally greater than or equal to about 5 wt. % to less than or equal to about 20 wt. %, of the second plurality of solid-state electrolyte particles 90.

In certain variations, the plurality of negative solid-state electroactive particles 50 may comprise a plurality of coated lithium-containing particles. For example, in some aspects the lithium-containing particles comprise a silicon-oxide ($SiO_x$, $0 \leq x \leq 2$) doped with lithium, referred to herein as a lithium-doped silicon oxide ($Li_ySiO_x$, $y \leq 4$, $0 \leq x \leq 2$). Additionally, in some aspects, for example where x is 0, the lithium-containing particles may comprise a lithium-doped silicon ($Li_ySi$, $0 < y \leq 4$), for example, lithium silicide. As used herein, "doped," "doping" or "dopant" refers additional metal atoms (e.g., Li atoms, etc.) present within a lattice structure of the silicon-oxide. For example, the additional metal atoms may be one or more of: (1) substitutions of atomic sites associated the silicon and/or oxygen, (2) disposed interstitially (e.g., as interstitial inclusions), and (3) disposed within the lattice structure.

In some aspects, the lithium-containing particles may be coated with a solid electrolyte. Generally, the solid electrolyte coating may provide electrical separation, for example, prevent physical contact with, the lithium-containing particles. The solid electrolyte coating may also provide a minimal resistance path for internal passage of ions. For example, the solid electrolyte coating may form all or a portion of a solid electrolyte interface within the negative electrode 22. In some embodiments, such as as illustrated with respect to FIG. 1, the solid electrolyte coating together with the solid-state electrolyte 26 may provide electrical and/or physical separation and a route of ion communication between the lithium-containing particles and the positive electrode 24.

In various aspects, the coating may comprise a lithium phosphorous sulfide ($Li_3PS_4$) LPS, an argyrodite-type solid electrolyte (for example, $Li_{7-m}PS_{6-m}X$, where $0 \leq m \leq 1$ and where X is chlorine (Cl), bromine (Br), or iodine (I)), or a combination of lithium phosphorous sulfide and argyrodite-type solid electrolyte.

The solid electrolyte coating may be continuously or substantially continuously disposed over all or substantially all of the surface of the lithium-containing particle. In some embodiments, the lithium-containing particle may be spherical or substantially spherical in shape, although it is understood that the particle may have an irregular surface or an irregular non-spherical shape. The particle may be considered to be a "core" having a surface upon which the solid electrolyte coating is disposed. In various aspects, the particle has a surface area that is the entire exterior surface of the particle.

In various embodiments, the solid electrolyte coating may cover at least about 90% of the surface area of the lithium-containing particles, alternatively, at least about 95% of the surface area, alternatively, at least about 96% of the surface area, alternatively, at least about 97% of the surface area, alternatively, at least about 98% of the surface area, alternatively, at least about 99% of the surface area, alternatively, at least about 99.5% of the surface area, alternatively, at least about 99.9% of the surface area, alternatively, at least about 99.95% of the surface area, alternatively, at least about 99.99% of the surface area, alternatively, at least about 99.995% of the surface area, alternatively, at least about 99.999% of the surface area, alternatively, at least about 99.9995% of the surface area.

In various aspects, the solid electrolyte coating may have a thickness from about 1 nanometer (nm) to about 500 nm, or from about 10 nm to about 400 nm, or from about 20 nm to about 350 nm, or from about 30 nm to about 300 nm, or from about 40 nm to about to about 200, or from about 50 nm to about 100 nm.

In certain variations, the negative electrode 22 may further include one or more conductive additives and/or binder materials. For example, the negative solid-state electroactive particles 50 (and/or second plurality of solid-state electrolyte particles 90) may be optionally intermingled with one or more electrically conductive materials (not shown) that provide an electron conduction path and/or at least one polymeric binder material (not shown) that improves the structural integrity of the negative electrode 22.

For example, the plurality of negative solid-state electro-active particles 50 (and/or second plurality of solid-state electrolyte particles 90) may be optionally intermingled with binders, such as polyvinylidene difluoride (PVDF), polytet-rafluoroethylene (PTFE), ethylene propylene diene mono-mer (EPDM) rubber, nitrile butadiene rubber (NBR), sty-rene-butadiene rubber (SBR), and/or lithium polyacrylate (LiPAA) binders. Electrically conductive materials may include, for example, carbon-based materials or a conduc-tive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacety-lene, polypyrrole, and the like. In certain aspects, mixtures of the conductive additives and/or binder materials may be used.

The negative electrode 22 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The negative electrode current collector 32 may be formed from copper (Cu), stainless steel, or any other electrically conductive material known to those of skill in the art.

Methods

Figure 2:
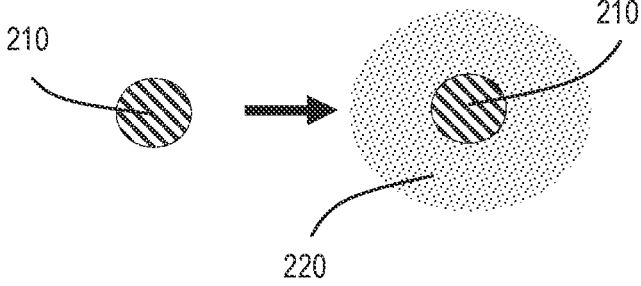
FIG. 2 is an illustration of an example of one or more steps in a method for forming a coated particle in accordance with various aspects of the current technology.
Figure 3:
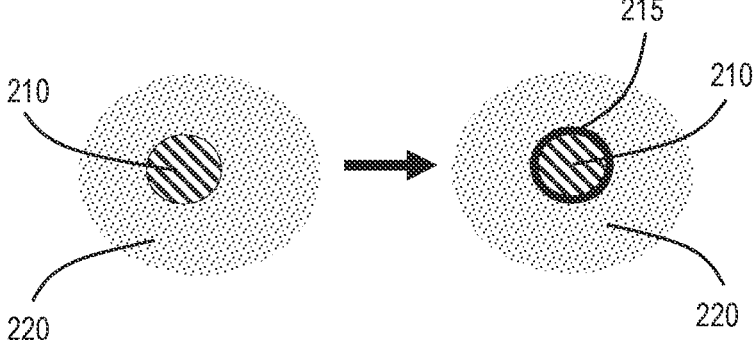
FIG. 3 is an illustration of an example of one or more additional steps in a method for forming a solid-state battery in accordance with various aspects of the current technology.
Figure 4:
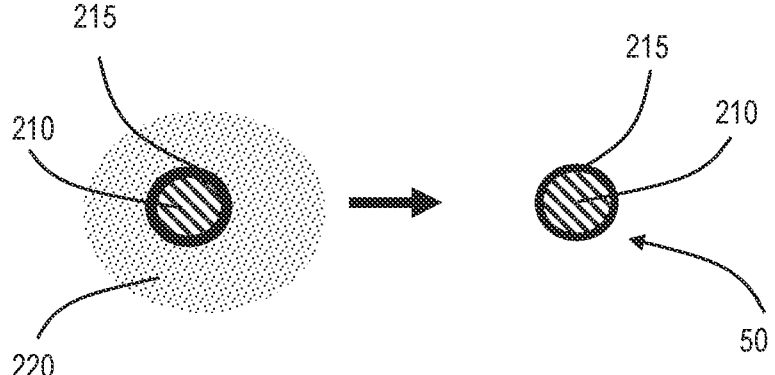
FIG. 4 is an illustration of an example of one or more steps in a method for forming a coated particle in accordance with various aspects of the current technology.

In various aspects, as described with respect to FIGS. 2-4, a method of preparing the negative solid-state electroactive particles 50 may generally include steps by which the lithium-containing particles are coated with the solid elec-trolyte coating. For example, the method described with respect to FIGS. 2-4 may yield a material (e.g., the negative solid-state electroactive particles 50, which may be referred to as an "anode powder" or "anode material") that may be employed in the preparation of an anode such as the negative electrode 22 described with respect to FIG. 1.

In some aspects, a solid electrolyte precursor solution may be prepared. The solid electrolyte precursor solution may generally include a solid electrolyte precursor, such as sulfur-rich phosphorous sulfide ($P_4S_{16}$), in a polar solvent. As an example, the polar solvent may include n-methyl-2-pyrrolidone (NMP), alcohols, acetone, acetonitrile, dichol-oromethane, dimethylformamide, dimethylsulfoxide, ethyl acetate, methyl ethyl ketone, tetrahydrofuran, and combina-tions thereof. Additionally or alternatively, in some aspects the solid electrolyte precursor solution includes the argy-rodite-type solid electrolyte ($Li_{7-m}PS_{6-m}X$, where $0 \leq m \leq 1$ and where X is chlorine (Cl), bromine (Br), or iodine (I)), dispersed in ester such as ethyl propionate (EP) and an alcohol such as ethanol (EtOH) as co-solvents.

In various aspects, the solid electrolyte precursor may be present within the solvent or combination of solvents in an amount from about 1.0 mg/mL to about 50 mg/mL, or from about 2.0 mg/mL to about 40 mg/mL, or from about 3.0 mg/mL to about 35 mg/mL, or from about 4.0 mg/mL to about 30 mg/mL, or from about 5.0 mg/mL to about 25 mg/mL, for example, about 10/mg/mL.

In some aspects, the lithium-containing particles, for example, lithium-doped silicon oxide ($Li_ySiO_x$, $y \leq 4$, $0 < x \leq 2$), may be contacted with the solid electrolyte precur-sor solution. The lithium-containing particles may be contacted with the solid electrolyte precursor solution via any suitable methodology, for example, dip coating or spray coating. For example, referring to FIG. 2, a lithium-contain-ing particle 210 may be immersed in a solid electrolyte precursor solution 220. Referring to FIG. 3, the lithium-containing particle 210 may be allowed to remain within the solid electrolyte precursor solution 220 until the solid elec-trolyte precursor solution reaches equilibrium, for example, until the reaction reaches completion, thereby forming the solid electrolyte coating 215 on the surface of the lithium-containing particle 210.

In some aspects, an approximate desired thickness of the solid electrolyte coating may be reached based upon selec-tion of the concentration and/or the volume of the solid electrolyte precursor solution, for example, based upon the number of moles of the solid electrolyte precursor. Not intending to be bound by theory, a relative increase in the concentration and/or volume of the solid electrolyte precur-sor solution may be effective to yield a relatively thicker solid electrolyte coating and, likewise, a relative decrease in the concentration and/or volume of the solid electrolyte precursor solution may be effective to yield a relatively thinner solid electrolyte coating.

Referring to FIG. 4, the after the solid electrolyte coating 215 has been formed on the lithium-containing particles 210, the coated lithium-containing particles may be rinsed and/or dried, for example, to remove any extraneous solid electrolyte precursor and yield the negative solid-state elec-troactive particles 50 (e.g., an "anode powder," which may be used to prepare a negative electrode 22 such as described with respect to FIG. 1). For example, in some aspects the coated lithium-containing particles may be dried at a tem-perature suitable to volatilize any solvent, for example, such as by heating to a temperature of about 150° C. to about 500° C., about 200° C. to about 400° C., about 250° C. to about 350° C., or about 275° C. to about 325° C. It is also contemplated herein that drying can include grinding the lithium-containing particles to form particles or a powder of a desired size and/or consistency, for example, via ball milling Alternatively, in some aspects a method of preparing the negative solid-state electroactive particles 50 may generally comprise coating a non-lithiated particle with the solid electrolyte coating. For example, silicon oxide ($SiO_x$, $0 < x \leq 2$) particles may be similarly coated with the solid electrolyte coating, such as by dipping the silicon oxide particles in a solid electrolyte precursor solution to form the solid electrolyte coating, rinsing, and drying the coated silicon oxide particles. In some aspects, the coated silicon oxide particles may be lithiated, for example, such that lithium migrates to the silicon oxide to form coated lithium-doped silicon oxide particles.

Additionally, in some aspects, an electrode, for example, the negative electrode 22 as described with respect to FIG. 1, may be prepared by a method that generally includes one or more steps for depositing the negative solid-state elec-troactive particles 50 on the negative electrode current collector 32. For example, the negative solid-state electro-active particles 50 (e.g., an anode powder or anode material) may be combined with a solvent to form a slurry. Non-limiting examples of suitable solvents include xylene, hexane, methyl ethyl ketone, acetone, toluene, dimethylfor-mamide, aromatic hydrocarbons, n-methyl-2-pyrrolidone (NMP), and combinations thereof. Additional components of the negative electrode, for example, second plurality of solid-state electrolyte particles 90, binders, or electrically-conductive materials such as graphite, may also be included within the slurry. The slurry may applied to the negative electrode current collector 32 with any suitable device such as a knife, a slot die, direct gravure coating, or micro-gravure coating. Following application of the slurry onto the negative electrode current collector 32, the method may further include a drying or volatilization step to remove the solvent present in the applied slurry to form the negative electrode 22. Drying can be performed at a temperature suitable to volatilize the solvent, for example, about 45° C. to 150° C. The methods may be performed at low humidity conditions, e.g., at 10% relative humidity (RH) or lower, e.g., 5% RH, 1% RH (−35° C. or lower dew point).

Alternatively, in some aspects a dry-processing methodology may be employed to dispose the negative solid-state electroactive particles 50 (e.g., the solid electrolyte-coated silicon oxide particles) with respect to the negative electrode current collector 32. For example, the negative solid-state electroactive particles 50 may be applied to the negative electrode current collector 32 as a powder.

Additionally, in some aspects, a solid-state battery, such as the battery 20 described with respect to FIG. 1, may be formed by way of a method that generally includes the steps for positioning the negative electrode 22 with respect to the positive electrode 24 and the electrolyte 26 and pressing the layers together.

For example, the negative electrode 22 may be disposed adjacent to the electrolyte 26 adjacent to the positive electrode 24. In various aspects, the various layers may be positioned (e.g., stacked) together substantially contemporaneously or, alternatively, two or more layers may be stacked together (e.g., preassembled) prior to stacking with another layer or combination of layers.

With the two or more layers positioned with respect to each other, pressure may be applied to the stacked layers, which may be effective to ensure intimate contact between these layers. For example, in some aspects, a pressure of from 0.1 MPa to about 100 MPa may be applied to press the components together.

In some aspects, the method of forming a battery, as described herein, may include one or more additional, post-processing steps. For example, the electrodes and/or cells formed according to these methods may be subjected to additional processing to progress the electrodes and/or cells toward an intermediate product or the end-product, for example, the battery 20 discussed with respect to FIG. 1. For example, in some aspects, one or more tabs may be attached to one or more of the electrodes. For example, a negative tab may be attached (e.g., welded) to the negative electrode current collector 32 and a positive tab may be attached (e.g., welded) to the positive electrode current collector 34. Also, in some aspects, the cells may be sealed, such as by placement within an aluminum-laminated bag or container and/or by vacuum-sealing.

Advantages

The methods described herein, for example, with respect to FIGS. 2-4, may be particularly advantageous. Without limiting the scope or function of the present technology, in some aspects, the solid electrolyte coating on the negative solid-state electroactive particles 50 may be effective to reduce the reactivity of and/or to stabilize the lithium-containing particles, relative to similar negative solid-state electroactive particles lacking a solid electrolyte coating.

Additionally, in some aspects the solid electrolyte coating on the negative solid-state electroactive particles 50 may be effective to enhance the compatibility and processability of the negative solid-state electroactive particles 50 relative to similar negative solid-state electroactive particles lacking a solid electrolyte coating. For example, in the absence of a protective solid electrolyte coating, lithium-containing particles (e.g., lithium-doped silicon oxide ($Li_ySiO_x$, $y\leq4$, $0<x\leq2$)) may exhibit reactivity with respect to water, acidic groups, or polar groups present on organic solvents, as may be present or employed in preparing a battery or components thereof.

Additionally, in some aspects the solid electrolyte coating on the negative solid-state electroactive particles 50 may be effective to improve ionic and/or physical contact between components of the cell on both a micro-interface scale and a macro-interface scale. For instance, the solid electrolyte coating on the negative solid-state electroactive particles 50 may improve contact at a micro-interface scale by improving point-to-point contact between adjacent or proximate particles, and at a macro-interface scale by improving contact between adjacent layers.

A battery, such the battery 20 discussed with respect to FIG. 1, may also exhibit excellent performance characteristics. Not intending to be bound by theory, by improving contact at a micro-interface scale (e.g., by improving point-to-point contact between adjacent or proximate particles) and at a macro-interface scale (by improving contact between adjacent layers) batteries formed according to the methods disclosed herein may overcome electrochemical deficiencies attributable poor interfacial contact.

Non-Limiting Discussion of Terminology

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

As used herein, the singular forms "a," "an," and "the" may be intended to include the plural forms as well, unless the context clearly indicates otherwise.

The word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components or process steps, the present technology also specifically includes embodiments consisting of, or consisting essentially of, such materials, components or processes excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein. Further, as used herein the term "consisting essentially of" recited materials or components envisions embodiments "consisting of" the recited materials or components.

The headings (such as "Background" and "Summary") and sub-headings used herein are intended only for general organization of topics within the present technology, and are not intended to limit the technology of the technology or any aspect thereof. In particular, subject matter disclosed in the "Background" may include novel technology and may not constitute a recitation of prior art. Subject matter disclosed in the "Summary" is not an exhaustive or complete technology of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

It should be understood that one or more steps within a method may be executed in different order (or concurrently) without altering the principles of the present technology. Further, although each of the embodiments is described above as having certain features, any one or more of those features described with respect to any embodiment of the technology can be implemented in and/or combined with features of any of the other embodiments, even if that combination is not explicitly described. In other words, the described embodiments are not mutually exclusive, and permutations of one or more embodiments with one another remain within the scope of this technology. For example, a component which may be A, B, C, D or E, or combinations thereof, may also be defined, in some embodiments, to be A, B, C, or combinations thereof.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

What is claimed is:

1. An anode material comprising a plurality of negative solid-state electroactive particles, each of the plurality of negative solid-state electroactive particles consisting of:
   a lithium-doped silicon oxide comprising $Li_ySiO_x$, $y \le 4$, $0 \le x \le 2$; and
   a solid electrolyte coating comprising $Li_3PS_4$ or $Li_{7-m}PS_{6-m}X$, where $0 \le m \le 1$ and where X is chlorine (Cl), bromine (Br), or iodine (I);
   wherein the solid electrolyte coating has a thickness of about 20 nm to about 350 nm.

2. The anode material of claim 1, wherein the solid electrolyte coating is substantially continuously disposed over substantially all of the surface of the lithium-doped silicon oxide.

3. The anode material of claim 1, wherein the solid electrolyte coating has a thickness from about 50 nm to about 100 nm.

4. The anode material of claim 1, further comprising a carbon-based material.

5. A method of preparing the anode material of claim 1, the method comprising:
   preparing a solid electrolyte precursor solution, the solid electrolyte precursor solution comprising a solid electrolyte precursor and a solvent; and
   contacting a plurality of lithium-doped silicon oxide particles with the solid electrolyte precursor solution to form a solid electrolyte coating.

6. The method of claim 5, wherein the solid electrolyte precursor comprises $P_4S_{16}$, and wherein the solvent comprises n-methyl-2-pyrrolidone (NMP).

7. The method of claim 5, wherein the solid electrolyte precursor comprises $Li_{7-m}PS_{6-m}X$, where $0 \leq m \leq 1$ and where X is chlorine (Cl), bromine (Br), or iodine (I), wherein the solvent comprises an ester and an alcohol as co-solvents.

8. The method of claim 5, wherein the silicon oxide is a lithium-doped silicon oxide when the silicon oxide is contacted with the solid electrolyte precursor solution.

9. The method of claim 5, wherein the silicon oxide is a non-lithiated silicon oxide when the silicon oxide is contacted with the solid electrolyte precursor solution, and further comprising lithiating the silicon oxide after the solid electrolyte coating is formed.

10. The method of claim 5, wherein contacting the plurality of silicon oxide particles with the solid electrolyte precursor solution comprises immersing the silicon oxide particles in the solid electrolyte precursor solution.

11. An anode comprising:
a plurality of negative solid-state electroactive particles, each of the plurality of negative solid-state electroactive particles comprising:
a lithium-doped silicon oxide; and a solid electrolyte coating, wherein the solid electrolyte coating has a thickness from about 20 nm to about 350 nm; and
a plurality of solid-state electrolyte particles consisting of a solid-state electrolyte; wherein the plurality of negative solid-state electroactive particles is present in an amount of greater than or equal to about 30 wt. % to less than or equal to about 98 wt. % and the plurality of solid-state electrolyte particles is present in an amount of greater than or equal to about 5 wt. % to less than or equal to about 20 wt. %.

12. The anode of claim 11, wherein the lithium-doped silicon oxide comprises $Li_ySiO_x$, $y \leq 4$, $0 \leq x \leq 2$.

13. The anode of claim 11, wherein the solid electrolyte coating comprises $Li_3PS_4$.

14. The anode of claim 11, wherein the solid electrolyte coating comprises $Li_{7-m}PS_{6-m}X$, where $0 \leq m \leq 1$ and where X is chlorine (Cl), bromine (Br), or iodine (I).

15. The anode of claim 11, wherein the solid electrolyte coating is substantially continuously disposed over substantially all of the surface of the lithium-doped silicon oxide.

* * * * *